(12) United States Patent
Pöyhönen et al.

(10) Patent No.: US 12,498,961 B2
(45) Date of Patent: Dec. 16, 2025

(54) METRICS IN DISTRIBUTED COMPUTING

(71) Applicant: Nokia Technologies Oy, Espoo (FI)

(72) Inventors: Ville Petteri Pöyhönen, Nummela (FI); Janne Einari Tuononen, Nummela (FI)

(73) Assignee: Nokia Technologies Oy, Espoo (FI)

( * ) Notice: Subject to any disclaimer, the term of this patent is extended or adjusted under 35 U.S.C. 154(b) by 427 days.

(21) Appl. No.: 18/164,186

(22) Filed: Feb. 3, 2023

(65) Prior Publication Data

US 2023/0259388 A1    Aug. 17, 2023

(30) Foreign Application Priority Data

Feb. 16, 2022   (FI) ...................................... 20225137

(51) Int. Cl.
    *G06F 9/44*     (2018.01)
    *G06F 9/46*     (2006.01)

(52) U.S. Cl.
    CPC .................................... *G06F 9/467* (2013.01)

(58) Field of Classification Search
    CPC ...................................... G06F 9/467
    USPC ........................................ 718/101
    See application file for complete search history.

(56) References Cited

U.S. PATENT DOCUMENTS

| | | | |
|---|---|---|---|
| 8,032,626 B1 | 10/2011 | Russell et al. | |
| 8,826,290 B2 | 9/2014 | Watanabe et al. | |
| 9,509,706 B2 | 11/2016 | Wada et al. | |
| 10,516,747 B2 | 12/2019 | Greifeneder et al. | |
| 11,044,187 B2 | 6/2021 | Agarwal et al. | |
| 2012/0166430 A1 | 6/2012 | Bakalov | |
| 2012/0331135 A1* | 12/2012 | Alon | H04L 67/125 709/224 |
| 2013/0346427 A1 | 12/2013 | Impink | |
| 2015/0339210 A1* | 11/2015 | Kopp | G06F 11/34 718/100 |
| 2018/0217881 A1 | 8/2018 | Garcia et al. | |
| 2019/0280950 A1 | 9/2019 | Alshafei et al. | |

(Continued)

OTHER PUBLICATIONS

"Patterns for distributed transactions within a microservices architecture", Red Hat Developer, Retrieved on Jan. 31, 2023, Webpage available at : https://developers.redhat.com/blog/2018/10/01/patterns-for-distributed-transactions-within-a-microservices-architecture#.

(Continued)

*Primary Examiner* — Timothy A Mudrick
(74) *Attorney, Agent, or Firm* — Laine IP (57) ABSTRACT

According to an example aspect of the present invention, there is provided apparatus comprising at least one processing core, at least one memory including computer program code, the at least one memory and the computer program code being configured to, with the at least one processing core, cause the apparatus at least to store group definition information, receive plural reports from a set of distributed-computing entities each report comprising performance information and a transaction identifier, form a group of at least a proper subset of the plural reports based on their respective transaction identifiers and the group definition information, and obtain an aggregate performance report using both the performance information in each one of the reports in the group, and a performance metric of the group.

14 Claims, 6 Drawing Sheets

(56) References Cited

U.S. PATENT DOCUMENTS

2020/0252262 A1    8/2020    Cao Minh et al.
2020/0328952 A1   10/2020   Makwarth et al.

OTHER PUBLICATIONS

Fielding et al., "Hypertext Transfer Protocol (HTTP/1.1): Semantics and Content", RFC 7231, Internet Engineering Task Force (IETF), Jun. 2014, pp. 1-101.

"Extensions", http2 explained, Retrieved on Jan. 31, 2023, Webpage available at : https://http2-explained.haxx.se/en/part7.

Bishop, "Hypertext Transfer Protocol Version 3 (HTTP/3) draft-ietf-quio-http-34", Feb. 2, 2021, 129 pages.

Iyengar et al., "QUIC: A UDP-Based Multiplexed and Secure Transport", RFC 9000, Internet Engineering Task Force (IETF), May 2021, pp. 1-148.

"Introduction to HTTP/2", web.dev, Retrieved on Jan. 31, 2023, Webpage available at : https://web.dev/performance-http2/.

"List of HTTP header fields", Wikipedia, Retrieved on Jan. 31, 2023, Webpage available at : https://en.wikipedia.org/wiki/List_of_HTTP_header_fields.

"HTTP/3, QUIC, and How it Works", Cabulous Medium, Retrieved on Jan. 31, 2023, Webpage available at : https://cabulous.medium.com/http-3-quic-and-how-it-works-c5ffdb6735b4.

"Bloom filter", Wikipedia, Retrieved on Jan. 31, 2023, Webpage available at : https://en.wikipedia.org/wiki/Bloom_filter.

"Probability", Wikipedia, Retrieved on Jan. 31, 2023, Webpage available at : https://en.wikipedia.org/wiki/Probability.

"Element (mathematics)", Wikipedia, Retrieved on Jan. 31, 2023, Webpage available at : https://en.wikipedia.org/wiki/Element_(mathematics).

"Set (abstract data type)", Wikipedia, Retrieved on Jan. 31, 2023, Webpage available at : https://en.wikipedia.org/wiki/Set_(abstract_data_type).

"Quotient filter", Wikipedia, Retrieved on Jan. 31, 2023, Webpage available at : https://en.wikipedia.org/wiki/Quotient_filter.

"Cuckoo filter", Wikipedia, Retrieved on Jan. 31, 2023, Webpage available at : https://en.wikipedia.org/wiki/Cuckoo_filter.

Office action received for corresponding Finnish Patent Application No. 20225137, dated Jun. 9, 2022, 10 pages.

Extended European Search Report received for corresponding European Patent Application No. 23153661.6, dated Sep. 22, 2023, 13 pages.

* cited by examiner

| | F1 | F2 | F3 |
|---|---|---|---|
| BF1 | ID1.1,...,ID1.N | ID2 | ID3 |
| BF2 | ID4.1,...,ID4.N | ID5 | ID6 |
| BF3 | ID7.1,...,ID7.N | ID8 | ID9 |
| BF4 | ID10.1,...,ID10.N | ID11 | ID12 |

METRICS IN DISTRIBUTED COMPUTING

FIELD

The present disclosure relates to managing execution of tasks in distributed computing environments.

BACKGROUND

For microservice architectures and other computing architectures where service implementation is distributed, such as service function chaining, SFC, performance monitoring of end-to-end, E2E, service transactions play an important role due to that fact that runtime conditions of distributed computing environments are not static, and thus may vary over time.

When service implementation is distributed over multiple networks or technology domains, monitoring of computation performance in the distributed computing environment becomes of interest, as service deployment scalability may be negatively affected by introduction of monitoring nodes.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to store group definition information, receive plural reports from a set of distributed-computing entities each report comprising performance information and a transaction identifier, form a group of at least a proper subset of the plural reports based on their respective transaction identifiers and the group definition information, and obtain an aggregate performance report using both the performance information in each one of the reports in the group, and a performance metric of the group.

According to a second aspect of the present disclosure, there is provided an apparatus comprising at least one processing core, at least one memory including computer program code, the at least one memory and the computer program code being configured to, with the at least one processing core, cause the apparatus at least to receive, at a distributed-computing entity, a service request from a client node, perform a functionality defined by the service request, wherein the performing of the functionality comprises transmitting a second service request to a second distributed-computing entity and processing a response from the second distributed-computing entity, transmit at least one report comprising performance information describing the performing of the functionality, and a transaction identifier determined by the apparatus based on the service request, and provide, to the client node, a response to the service request or pass processing of the service request to a third distributed-processing entity.

According to a third aspect of the present disclosure, there is provided an apparatus comprising at least one processing core, at least one memory including computer program code, the at least one memory and the computer program code being configured to, with the at least one processing core, cause the apparatus at least to generate group definition information and groups of transaction identifiers, the group definition information defining, implicitly or explicitly, the groups among the transaction identifiers, provide the group definition information to a performance monitoring function of a distributed-computing system, and provide the groups of transaction identifiers to distributed-computing entities of the distributed-computing system.

According to a fourth aspect of the present disclosure, there is provided a method, comprising storing group definition information, receiving plural reports from a set of distributed-computing entities, each report comprising performance information and a transaction identifier, forming a group of at least a proper subset of the plural reports based on their respective transaction identifiers and the group definition information, and obtaining an aggregate performance report using both the performance information in each one of the reports in the group, and a performance metric of the group.

According to a fifth aspect of the present disclosure, there is provided a method, comprising receiving, at a distributed-computing entity, a service request from a client node, performing a functionality defined by the service request, wherein the performing of the functionality comprises transmitting a second service request to a second distributed-computing entity and processing a response from the second distributed-computing entity, transmitting at least one report comprising performance information describing the performing of the functionality, and a transaction identifier determined based on the service request, and providing, to the client node, a response to the service request or passing processing of the service request to a third distributed-processing entity.

According to a sixth aspect of the present disclosure, there is provided a method, comprising generating group definition information and groups of transaction identifiers, the group definition information defining, implicitly or explicitly, the groups among the transaction identifiers, providing the group definition information to a performance monitoring function of a distributed-computing system, and providing the groups of transaction identifiers to distributed-computing entities of the distributed-computing system.

According to a seventh aspect of the present disclosure, there is provided an apparatus comprising means for storing group definition information, receiving plural reports from a set of distributed-computing entities, each report comprising performance information and a transaction identifier, forming a group of at least a proper subset of the plural reports based on their respective transaction identifiers and the group definition information, and obtaining an aggregate performance report using both the performance information in each one of the reports in the group, and a performance metric of the group.

According to an eighth aspect of the present disclosure, there is provided an apparatus comprising means for receiving, at a distributed-computing entity, a service request from a client node, performing a functionality defined by the service request, wherein the performing of the functionality comprises transmitting a second service request to a second distributed-computing entity and processing a response from the second distributed-computing entity, transmitting at least one report comprising performance information describing the performing of the functionality, and a transaction identifier determined based on the service request, and providing, to the client node, a response to the service request or passing processing of the service request to a third distributed-processing entity.

According to a ninth aspect of the present disclosure, there is provided a non-transitory computer readable medium having stored thereon a set of computer readable instructions that, when executed by at least one processor, cause an apparatus to at least store group definition information, receive plural reports from a set of distributed-computing entities, each report comprising performance information and a transaction identifier, form a group of at least a proper subset of the plural reports based on their respective transaction identifiers and the group definition information, and obtain an aggregate performance report using both the performance information in each one of the reports in the group, and a performance metric of the group.

According to a tenth aspect of the present disclosure, there is provided a non-transitory computer readable medium having stored thereon a set of computer readable instructions that, when executed by at least one processor, cause an apparatus to at least receive, at a distributed-computing entity, a service request from a client node, perform a functionality defined by the service request, wherein the performing of the functionality comprises transmitting a second service request to a second distributed-computing entity and processing a response from the second distributed-computing entity, transmit at least one report comprising performance information describing the performing of the functionality, and a transaction identifier determined by the apparatus based on the service request, and provide, to the client node, a response to the service request or pass processing of the service request to a third distributed-processing entity.

EMBODIMENTS

In a distributed computing environment, evaluating the performance of distributed computing tasks is useful in running the distributed computing environment and provides information usable in managing the execution of tasks in the distributed computing environment. According to methods disclosed herein, such evaluation is done using reports received from distributed-computing nodes comprised in the distributed environment, the reports comprising transaction identifiers which enable grouping the reports into groups for obtaining, from the grouped reports, aggregate performance reports which describe how the distributed computing task was performed in the distributed computing environment. The distributed-computing nodes may be physically distinct hardware computation nodes, and/or they may comprise logical or virtual computation nodes, wherein a single hardware node may run one or more logical or virtual computation node. While discussed in the present document as distributed-computing nodes, in case the computing entity which performs processing does not run a separate instance of an operating system, the entity may be referred to as a distributed-computing container. In other words, a distributed-computing entity may comprise a distributed-computing node, which runs an instance of an operating system, or a distributed-computing entity may comprise a distributed-computing container. Both the distributed-computing nodes and the distributed-computing containers may be configured to transmit the reports as described herein.

Figure 1A:
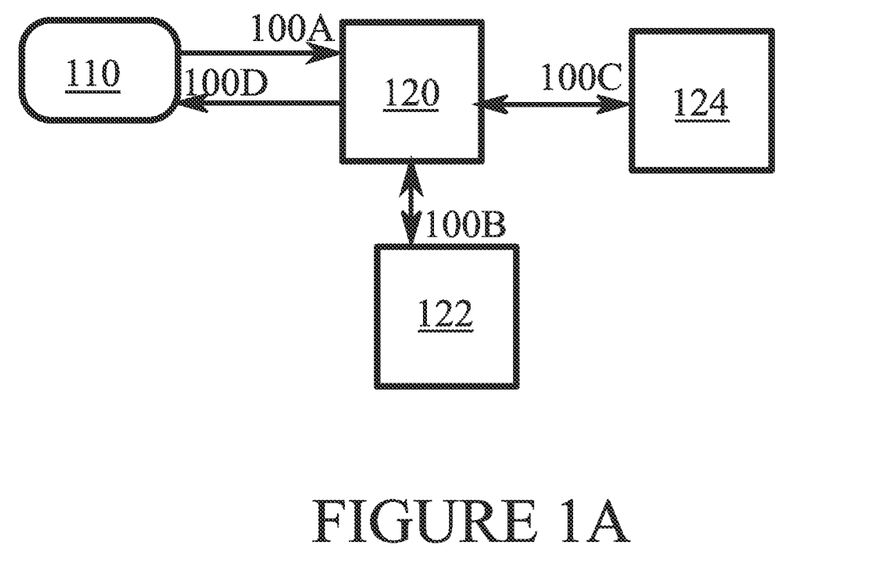
FIG. 1A illustrates an example system in accordance with at least some embodiments of the present invention.

FIG. 1A illustrates an example system in accordance with at least some embodiments of the present invention. In the system, client node 110 uses a distributed computing environment which comprises distributed-computing nodes 120, 122 and 124 to perform a task, which may comprise video rendering, machine learning, radar signal processing or machine translation, for example. In general, a broad range of computation tasks are well suited to being run in a distributed manner. The number of distributed-computing nodes in the figure, three, is merely an example to which the present disclosure is not limited.

In phase 100A, client 110 provides a service request to distributed-computing node 120. This node 120, in this example, performs a part of the processing of the service request itself, and invokes distributed-computing nodes 122 and 124 to perform other parts of the processing of the service request, in phases 100B and 100C. Phases 100B and 100C may comprise, for example, remote procedure calls, RPCs, or HTTP requests. In distributed computing, an RPC is when a computer program causes a procedure, such as a subroutine, to execute in a different address space, which may be on another computer. In other words, the processing is split between distributed-computing nodes 120, 122 and 124. Reasons for the split may include that distributed-computing node 120 doesn't have access to all the input data needed to complete the service request, or that the service request is sought to be completed faster by offloading a part of the processing to other nodes. It is possible that some nodes in the distributed-computing environment are specialized to perform specific kinds of computing tasks, wherefore using these nodes for these tasks speeds up processing. Such specialization may include having dedicated specialized processors, such as graphics processors, for example. Distributed-computing node 120 provides a response to the service request in phase 100D. The service request may comprise a descriptor of the processing that is to be performed in response to the service request, and the service request may comprise data which is to be processed. Equally, the service request may comprise a link or pointer to the data which is to be processed, and the descriptor of the processing may also be referred to in the service request using a link or pointer. Either way, the service request of phase 100A enables distributed-computing node 120 to know what processing is being requested. A service request may comprise an HTTP request, for example.

Measuring aspects of performance of computing the service request of phase 100A presents challenges, since distributed-computing nodes 120, 122 and 124 may continually process parts of potentially a large number of different service requests, for different client nodes or for the same client node 110. Nodes 120, 122 and 124 may be in different domains. In this context, a domain may refer to an administrative domain or a networking domain, for example. A networking domain may be identified using a suitable network domain prefix, for example. With accurate performance measurement, load balancing between distributed-computing computing environments or sets of distributed-computing nodes may be performed for subsequent service requests. One example of a distributed computing environment is the Hexa-X environment which involves multiple domains and multiple computing clouds. In the Hexa-X environment, end-to-end, E2E, services are envisioned to be installed as groups of functions in multiple domains. Hexa-X is planned for 6G, sixth generation networks, as standardized by the $3^{rd}$ generation partnership project, 3GPP.

Figure 1B:
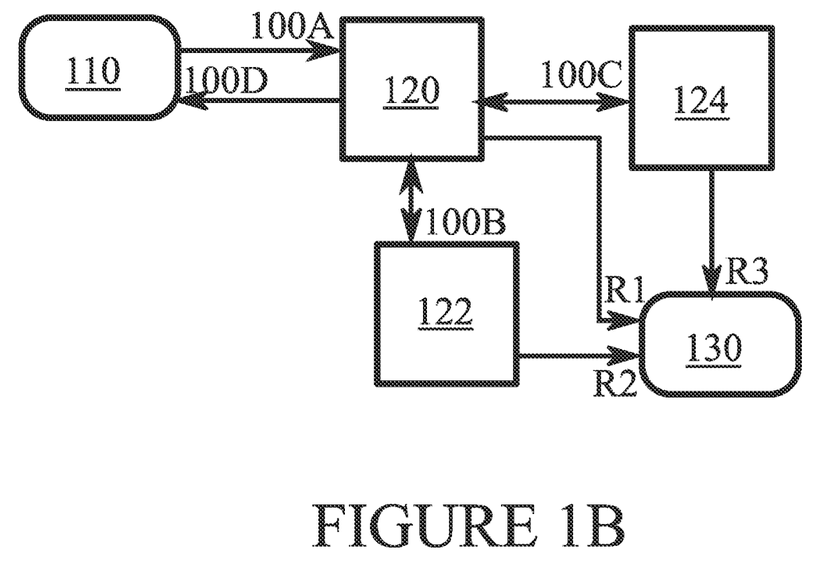
FIG. 1B illustrates the system of FIG. 1A in more detail.

FIG. 1B illustrates the system of FIG. 1A in more detail. In particular, performance manager 130 is depicted in FIG. 1B. Like numbering denotes like structure as in FIG. 1A. As illustrated in FIG. 1B, each distributed-computing node 120, 122 and 124 provides a report R1, R2 and R3, respectively, to performance manager 130. The order in which the reports arrive at performance manager 130 need not be the order in which they are sent, or the order in which the processing described by the reports takes place. In practical terms, reports such as reports R1, R2 and R3 may be sent by functionalities running in a distributed-computing node (or more generally a distributed-computing entity) 120, 122 and 124. In particular, report R1 comprises performance information describing the performing of the service request in distributed-computing node 120, report R2 comprises performance information describing the performing of the service request in distributed-computing node 122 and report R3 comprises performance information describing the performing of the service request in distributed-computing node 124. Thus, taken together, reports R1, R2 and R3 enable characterization of the performing of the service request 100A as a whole in the distributed-computing environment. Each report comprises a transaction identifier, allowing the reports to be associated with each other to form a group, the reports of the group comprising the performance information describing the performing of the service request. An address of performance manager 130 may be provided in or in connection with service request 100A, or it may already be known to the distributed-computing nodes.

The transaction identifier may be the same in reports R1, R2 and R3, providing a simple way to associate the reports together to form the group. In this case, for example, distributed-computing node 120 may select the transaction identifier, receive it in service request 100A or receive it from a further node, and then pass it along in calls 100B and 100C to enable nodes 122 and 124 to correctly report their performance information. For example, when distributed-computing node 120 selects the transaction identifier, it may include an identity of client node 100 in the transaction identifier to enable performance manager 130 to understand, which client requested the processing described by the group of reports. Alternatively to the transaction identifier being the same, the transaction identifiers of reports R1, R2 and R3 may be each be distinct from each other, but performance manager 130 may nonetheless be enabled to associate the reports with each other into the group based on the transaction identifiers, using group definition information present in performance manager. A benefit of using distinct transaction identifiers is that malicious eavesdroppers gaining access to reports R1, R2 and R3 will not be enabled to associate them into a group and thus obtain information on processing carried out by the distributed computing environment. Alternatively to storing the transaction identifier itself in the transaction identifier field of the report, the transaction identifier field may comprise a pointer to the actual transaction identifier, which is stored in a memory accessible to performance manager 130, such that performance manager 130 may retrieve the actual transaction identifier from the memory using the pointer. A benefit of using the pointer is also that an eavesdropper has a harder time associating the reports into groups, as the transaction identifier may be present in plural locations in the memory, and thus be retrievable using more than one pointer. When the transaction identifiers in the reports are different, distributed-computing nodes may use identifier selection information to choose which transaction identifier to include in their report(s).

Service request is 100A may be comprised in a protocol message which is addressed, in a header of the protocol message, to distributed-computing node 120 wherein the client node is a sender of the protocol message in an outermost protocol layer of the protocol message. For example, HTTP/2 or HTTP/3 may be used to communicate service request 100A. In other words, in this case there is no separate ingress/egress node between client node 110 and distributed-computing node 120. Likewise, client node 110 may encrypt the service request with a public key of distributed-computing node 120, such that no other node than distributed-computing node 120 is able to decrypt the service request.

While FIG. 1B illustrates each one of distributed-computing nodes 120, 122 and 124 providing its own report to performance manager 130, the system may alternatively be configured so that nodes 122 and 124 report their performance information to node 120 when returning service requests 100B and 100C, respectively, and node 120 sends one or more reports to performance manager 130, thus reporting performance information of the service request of phase 100A from all the distributed-computing nodes participating in processing this service request. Also in this case, the reports are associated with each other using their transaction identifier.

In addition to assessing the aggregate performance of the distributed computing environment in processing a service request which is computed in a distributed manner, using plural distributed-computing nodes, performance manager 130 may be configured to make determinations concerning individual ones of the distributed-computing nodes based on reports which comprise performance information describing computation performed in the respective distributed-computing node. Such a determination may be referred to as a performance report of a specific distributed-computing node. For example, in case the node has developed a failure, or is highly loaded leading to delays, performance manager 130 may flag the node as a node to be avoided for a time period (when heavily loaded), or for maintenance (in case of failure). In some embodiments, performance manager 130 is configured to automatically, without user input, configure a load balancer to decrease a quantity of processing directed to a heavily loaded distributed-computing node or distributed-computing environment. In some embodiments, performance manager 130 is configured to automatically, without user input, trigger a migration of an already started processing task to another distributed-computing environment as a response to a finding that the distributed-processing environment where the processing has already started is heavily loaded. In some embodiments, performance manager 130 is configured to trigger migration of functionalities running processing of a service request in a failing distributed-computing node to another distributed-computing node which is not failing. Alternatively, new functionalities may be initiated in node(s) which are not failing. In some embodiments, a virtual distributed-computing node is migrated automatically by performance manager 130 to different hardware as a response to a determination that hardware running the virtual distributed-computing node is not performing satisfactorily. In some cases, an overall service request processing may be unsatisfactory, however the cause of the problem may lie elsewhere than in the distributed-computing nodes, for example, it may lie in communication networks the distributed-computing nodes use to communicate with each other.

Figure 2A:
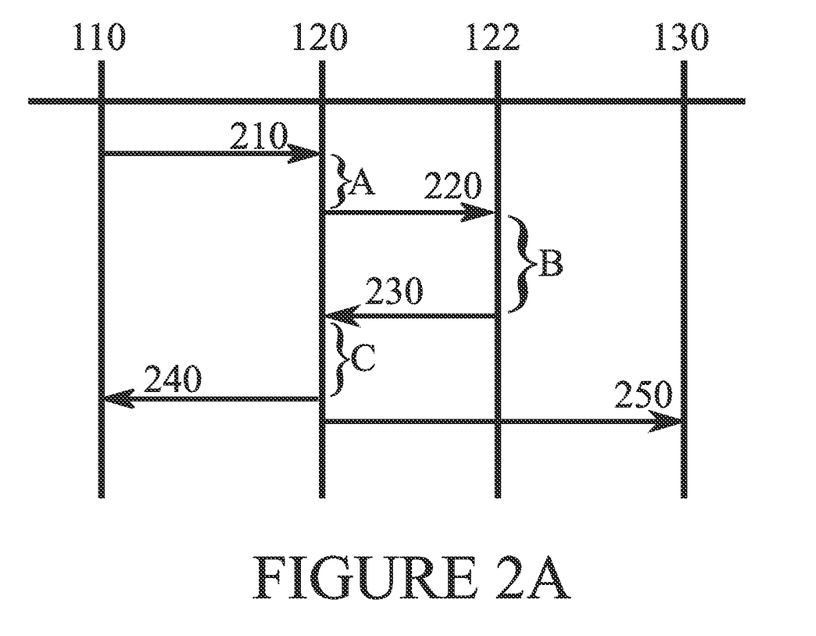
FIGS. 2A-2C illustrate signalling options capable of supporting at least some embodiments of the present invention.
Figure 2B:
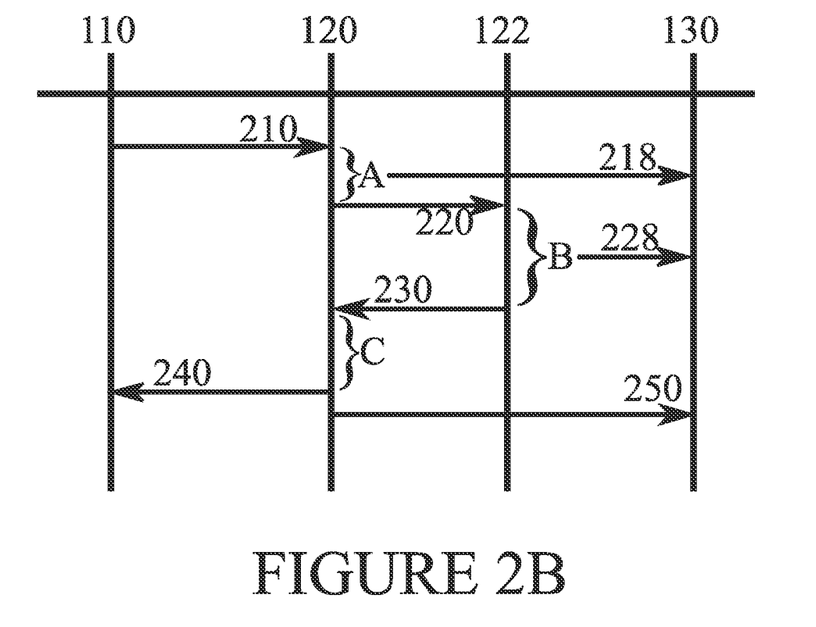

FIGS. 2A and 2B illustrate signalling options capable of supporting at least some embodiments of the present invention. In FIG. 2A, the vertical axes represent client node 110, distributed-computing nodes 120 and 122, and performance manager 130 of FIG. 1B. Time advances from the top toward the bottom. In these figures, client node 110 issues a service request in phase 210, which distributed-computing node 120 handles, using second distributed-computing node 122 to perform a part of the computing. In detail, distributed-computing node 120 calls second distributed-computing node 122 in phase 220, and receives a response to the call in phase 230. All in all, the processing of the service request is split into three segments, as illustrated, segments A and C taking place in distributed-computing node 120 and segment B taking place in second distributed-computing node 122. A response to the service request, in these example signalling options, is provided from distributed-computing node 120 as response 240.

In the signalling option of FIG. 2A, a single report 250 is provided from distributed-computing node 120, which comprises performance information describing processing of the service request of phase 210 in both distributed-computing node 120 and second distributed-computing 122. To enable this, second distributed-computing node 122 provides, for example in response 230, the performance information which describes processing segment B of the service request. Thus report 250 identifies, in addition to segments A and C, also segment B, describes the performance of segment B and identifies second distributed-computing node 122 as the node which performed the processing of segment B. Response 240 and report 250 may be sent in either order.

In the signalling option of FIG. 2B, separate reports are sent for processing segments A, B and C. In detail, distributed-computing node 120 sends reports 218 and 250 to performance manager 130 with performance information of segments A and C, respectively, and second distributed-computing node 122 sends report 228, comprising performance information of segment B, to performance manager 130. The sending of the reports 218, 228 and 250 need not, in FIG. 2B, take place at the time instants indicated in the figure, as long as they are sent during or shortly after the overall processing of service request 210. Report 218 may be sent as a response to a determination, by distributed-computing node 120, to send call 220, for example. In general, a distributed-computing node may be configured to transmit a report with processing information describing processing in the node to the performance manager responsive to determining to call another node, or responsive to determining to return a call from another node. As a further alternative, reports 218 and 250 may be transmitted aggregated together, or, alternatively, the performance information of these reports may be combined into a single report from distributed-processing node 120.

Figure 2C:
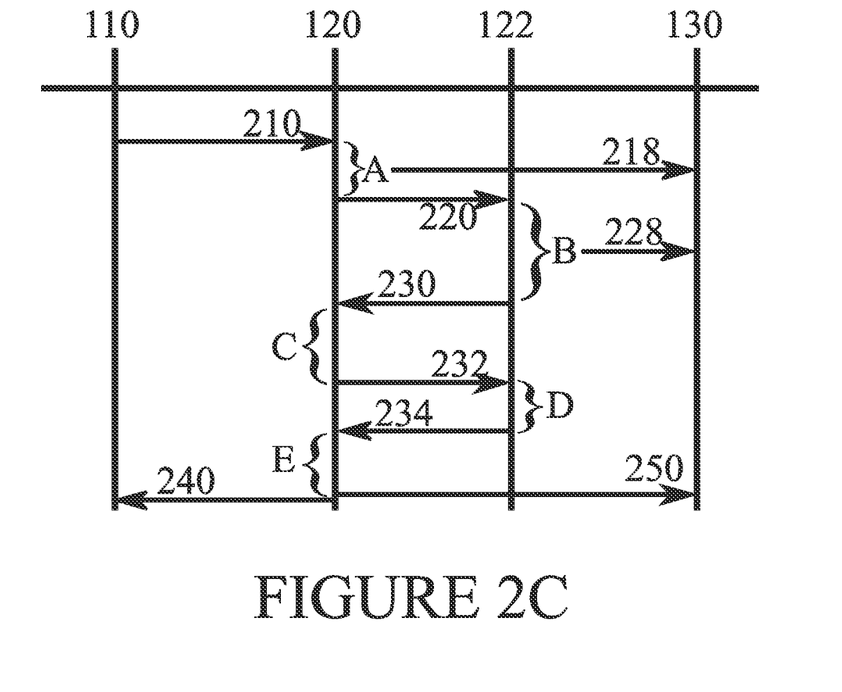

The signalling option of FIG. 2C combines features of FIGS. 2A and 2B. In detail, the processing here includes a second call 232 from distributed-computing node 120 to second distributed-computing node 122 (or, alternatively, to a further distributed-computing node), and the response 234 to this call 232. Processing of service request 210 this comprises segments A, C and E in distributed-computing node 120, and segments B and D in second distributed-computing node 122 (or, alternatively, segment D in the further distributed-computing node). The processing of segments A and B are reported in separate reports 218 and 228, as in FIG. 2B, and the processing of segments C, D and E are reported together, or in aggregated reports, in report phase 250. The calls of phases 220 and 232 may thus include instructions to the called distributed-computing node, whether the called node should report its processing promptly to performance manager 130, or whether the called node is to return the performance information back to the calling node. In case the called distributed-computing node is to report promptly, the call 220, 232 includes the identifier selection information enabling the called node to select a transaction identifier for the report 228.

Of note is that while in FIGS. 2A-2C, distributed-computing node 120 provides the response to the client node 110 in the form of response 240, this is not the only option as processing of the service request of phase 210 may proceed from distributed-computing node 120 to a further distributed-computing node, which may be the node that transmits the eventual response to client node 110. In other words, distributed-computing node 120 may provide a response to the service request to the client node, or it may pass processing of the service request to a further distributed-computing node. When passing the processing to the further distributed-computing node, distributed-computing node 120 may include the identifier selection information to enable the further node, too, to report its performance information to performance manager 130 in a way that allows performance manager 130 to group reports pertaining to processing service request 210 together into groups. If the further node calls nodes while processing the service request, it may provide the identifier selection information to these nodes, to enable grouping of the reports relating to the service request. A group may be a proper subset of all reports received in performance manager 130, by which it is meant that the group comprises some reports received in performance manager 130, but not all such reports.

Reports 218, 228 and 250 comprise the transaction identifier field, which enables performance manager 130 to group these reports together as pertaining to processing service request 210. A simple example is, where service request 210 comprises the transaction identifier, which distributed-computing node 120 provides to second distributed-computing node in call 220, such that both distributed-computing nodes use the same transaction identifier in their reports 218, 228 and 250. A more complex example is where distributed-computing node 120 uses identifier selection information, such as a filter definition or filter identifier, to determine the transaction identifier(s) it uses in reports 218 and 250, and distributed-computing node 120 provides the identifier selection information, or information derived from the identifier selection information, in call 220, to enable second distributed-computing node 122 to determine a further transaction identifier it will use in report 228. Performance manager 130 may use group definition information it has to group reports 218, 228 and 250 together. A benefit of not using the same transaction identifier in reports 218, 228 and 250 is that an eavesdropper is confused as to which reports should be grouped together, and confidentiality of processing in the distributed computing environment is thereby protected.

In general, distributed-computing node 120 may determine the transaction identifier it uses based on service request 210. This may comprise that service request 210 comprises the transaction identifier, or the identifier selection information based on which distributed-computing node 120 may determine the transaction identifier, or that distributed-computing node 120 may retrieve a next free transaction identifier or identifier selection information from a further node as a response to receiving service request 210. The identifier selection information may comprise, for example, an identifier of a pre-determined set of transaction identifiers, or an identifier of a space-efficient probabilistic data structure such as a Bloom filter, a quotient filter, a XOR filter or Cuckoo filter, for example. The XOR filter has been described by Graf & Lemire in 2019. Performance manager 130 may then use the set of transaction identifier sets and/or the set of space-efficient probabilistic data structures as group definition information to group the reports it receives into groups. A benefit of including the transaction identifier, or the identifier selection information, in the service request is that separate service requests executed in parallel are more effectively grouped separately, if this is the intent, as the distributed-computing node receiving the service requests can more dependably maintain the separate grouping of reports.

The system may further comprise a Bloom filter, BF, registry, where the states of distributed BFs are maintained and which provides a query interface, via which a next free BF index may be queried. Once the next available BF index, which is fetched by a distributed-computing node, the BF index being an example of the identifier selection information, then this BF entry becomes reserved in the registry and it cannot be re-queried by other nodes until performance manager 130 has made it available again via a suitable management interface. The registry is populated once BFs and their indices are generated. The quotient filters, XOR filters or Cuckoo filters may be used alternatively to, or additionally to, Bloom filters. A Bloom filter, for example, may be used to test whether a transaction identifier is comprised in a group using a service request IsMember(BF, transaction_identifier_toBeTested).

A single group of reports may correspond to a single service transaction or service request, or plural service transactions or service requests may be grouped together. For example, plural service transactions from client node 110 may be grouped together by providing, in their respective service requests, the same identifier selection information. Thus end-to-end service performance monitoring may be obtained in a dependable and configurable manner. The composition of a service deployment in a user plane may be expressed with transaction identifiers which are then parsed and interpreted in a management plane entity, the performance manager 130. More generally, a group identity of the distributed-computing nodes, which may be user plane entities, may be expressed as unique transaction identifiers, which may be management plane indicators, to ensure unified processing of the performance information of the distributed-computing nodes. Thus comparable performance information can then be used to aid in decision-making when dealing with distributed services. E2E service performance information provides tracking information of the associated distributed-computing nodes in case more detailed, node-specific diagnostics are needed to resolve underperforming service deployments to restore their quality of service.

Performance manager 130 may be aware of service-specific call structures that include, for instance, the information of nested calls, and based on those it may be able to detect when all performance reports for a given service, or group, has been received and when to start process them. Alternatively, client node 110 may inform performance manager 130 that the service request has been fully processed, triggering determination of the aggregate performance report of the processing of the service request, or set of service requests grouped together, in performance manager 130. The identifier selection information, such as filter identifier, used to group the reports may then be released for re-use.

Figure 3:
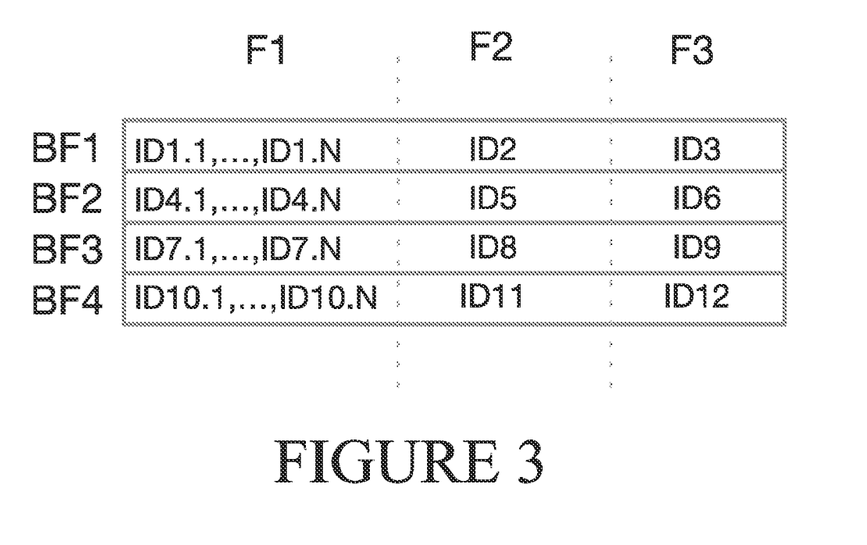
FIG. 3 illustrates an example set of Bloom filters in accordance with at least some embodiments of the present disclosure.

FIG. 3 illustrates an example set of Bloom filters. Here F1, F2 and F3 are distributed-computing nodes comprised in the distributed computing environment, and BF1, BF2, BF3 and BF4 are Bloom filters, pre-generated before their use in the system. Each Bloom filter (or alternatively quotient filter, XOR filter or Cuckoo filter) is associated with a set of transaction identifiers ID, on the rows of the table. In the case of using BFs, a number of BFs needed depends on the maximum number of different group reports at the same time. For example, if the system is dimensioned in such way that at any time, there cannot be more than N performance report groups active that are not yet processed, then it means that N+1 transaction identifier sets (BFs) is enough. Once the $(N+1)^{th}$ BF's index is taken into use, then the BF counter is reset and next BF to be used is again the first one.

In FIG. 3, the identifier selection information, BF index, such as BF1, informs each distributed-computation node which are the transaction identifier(s) they may use when reporting performance information to performance manager 130. For example, when distributed-computation node F2 is called with the identifier selection information set to "BF3", it will use ID8 as the transaction identifier in its report to performance manager 130. For example, once the right BF table row is found using a BF index, then each involved processing segment, such as A, and C in FIG. 2B, is assigned with its own transaction ID like ID<x>0.1 for A and ID<x>0.2 for B, where <x> is 1, 4, 7 or 10.

Figure 4:
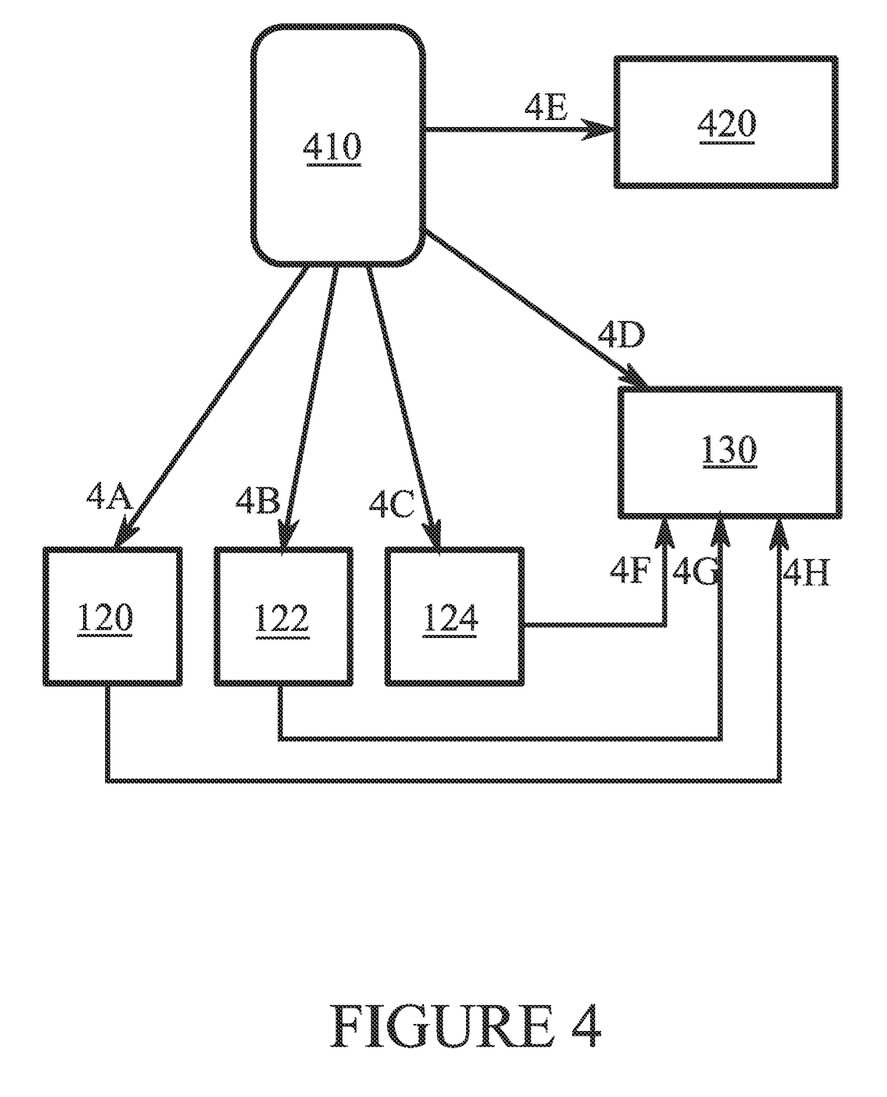
FIG. 4 illustrates management of multiple transaction identifiers in accordance with at least some embodiments of the present disclosure.

FIG. 4 illustrates management of multiple transaction identifiers in accordance with at least some embodiments of the present disclosure. Like numbering denotes like structure as in previous figures. While Bloom filters are used in this example, as discussed already herein above, other filters or, more generally, space-efficient probabilistic data structures, may be used instead of Bloom filters. An identifier generator 410 initially generates a set of Bloom filters, and for each Bloom filter, a set of transaction identifiers, as illustrated in FIG. 3. The transaction identifiers are provided to each of distributed-computation nodes 120, 122 and 124 in phases 4A, 4B and 4C, respectively, associated with the identifier selection information in the form of filter identifiers. Following these phases, the distributed-computation nodes 120, 122 and 124 are able to select a transaction identifier based on a Bloom filter index provided to them as identifier selection information.

In phase 4D, identifier generator 410 provides the Bloom filters to performance manager 130. After phase 4D, performance manager 130 is enabled to test, if a transaction identifier it receives in a report is comprised in a set defined by one of the Bloom filters, as illustrated in FIG. 3. A Bloom filter registry 420 may be maintained to facilitate selecting a free Bloom filter from the generated set of Bloom filters for monitoring performance of a newly initiated service request, or set of service requests grouped together. The reports comprising performance information from the distributed-computing nodes are schematically denoted as phases 4F, 4G and 4H in FIG. 4. This delivery of reports may be done in multiple ways like using request-response or publish-subscribe communication patterns. Performance manager 130 then combines the reports from different sources into a single aggregate performance report based on the transaction identifiers in the received reports. Without such identifiers, performance manager 130 cannot dependably group together individual reports from different nodes representing the same service transaction.

Performance manager 130 may occasionally not receive all reports relating to a specific service request, or set of service requests grouped together for performance monitoring. In these cases, performance manager 130 may be configured to discard the reports it did receive, or use them only for assessing how individual distributed-computing nodes functioned to locate possible fault or overload situations in these nodes.

The reports from the distributed-computing nodes will be described next. In detail, these reports comprise, as described above, the performance information and the transaction identifier. Further, they may comprise an identifier of the distributed-computing node which compiles the report, or, when the report comprises performance information of processing in plural such nodes, the identities of all distributed-computing nodes which contributed performance information to the report. In addition to the identity of the node(s), type(s) and/or runtime information of the node(s) may also be included in the report. The runtime information may be useful in case the distributed-computing nodes are virtual nodes, rather than physical nodes. In some embodiments, the distributed-computing nodes are distinct physical computing nodes, and distributed-computing nodes in a same distributed computing environment may be in more than one networking domain. In some embodiments, transaction identifiers included in the reports comprise a domain identifier identifying a domain from where the report originates.

The performance information may comprise one or more of the following: a time delay indicating how long the processing in the node took, at least one timestamp indicating when a call was received in the node and/or a response sent from the node, a processor cycle count consumed in the reported processing, a processor load status of the distributed-computing node transmitting the respective report, an indication of fault status, a networking resource use, a disk resource use, memory use, and an indication of an absence of a fault status of the distributed-computing node transmitting the respective report.

The reports may further comprise information on the service request, such as function type classification, client node identity or timestamp, when the call was received in the node sending the report, or participating in the report. These timestamps enable determining a call order among the group of reports in performance manager 130.

In obtaining an aggregate performance report using both the performance information in each one of the reports in the group, and a performance metric of the group, time is a relevant property. However, time is not the only relevant property due to fact that services are often formed from a set of disparate functionalities and functionality execution times are typically highly dependent on a runtime context, such as service input, parameters and resources. Moreover, the fact whether a functionality is shared by multiple services can affect overall performance. For example, if one considers a video rendering service request, the time spent in the rendering depends on the size of raw input data, the used codec and the amount and type of the available computing resources. When the aggregate performance of a service request is evaluated, these metrics may be considered to make the performance of independent functionality executions accurately comparable.

Depending on the service request type, the way how certain performance aspects affect the aggregate performance can also differ and thus a performance metric, which is used to calculate comparable time values, should be function specific, that is, common between reports in a same group, although separate groups of reports may use the same metric. For example, the performance information obtained from the plural reports in the group may be additively joined together as in: Aggregate Performance=sum(PE(F1 . . . F3))+other latencies, where PE is the performance metric and F1 . . . F3 the distributed-computing nodes that participate in processing the service request, or set of service requests grouped together for performance monitoring. In case performing the service request(s) branches to plural branches, the aggregate performance may be taken as the maximum-delay branch from among the plural branches. The performance metric may, for example, weigh more heavily performance delays in nodes which are specialized and less available than general-purpose nodes. Specialized nodes may have processors optimized for certain kinds of tasks, such as correlation or graphics processing, making then highly suited to processing specific parts of the service request(s). There exist several ways of defining the performance metrics in ways that make sense in the given implementation, given its technical constraints. In some embodiments, machine learning is employed in performance manager 130 to detect changes and trends in aggregate performance.

In some embodiments, for endpoints in between which a new transaction identifier is transferred, there are a few requirements: firstly, an application logic must know that such a transaction identifier is needed and from where it can be acquired, and how, that is, via local application programming interface independently of whether it is locally or externally managed and generated. The logic should know when to send this identifier, that is, enclose/piggyback it with new service requests or send it (in timely manner) via an out-of-band channel. Alternatively, the logic may know when to add new transaction identifier and indicate this in the service request, for instance, and then an underlying protocol stack acquires/generates a new transaction identifier as requested and places it in the service request message. Secondly, for protocol stack wire format, there should be a way to encode this transaction identifier on the wire, that is, wire format should support it, or in case of using an out-of-band channel, then this channel should support transferring the transaction identifier. The former one, the application logic, is use case and application specific. The latter one, wire format, is used protocol stack specific and some hypertext transfer protocol, HTTP, based protocol stack related implementation details are described in the following.

For example, a HTTP/2 based protocol stack may be employed when using the wire format. HTTP/2 can interleave multiple messages, such as responses, in parallel without blocking on anyone. Therefore, it is possible to use a single connection to deliver multiple requests and responses in parallel. Non-standard header fields were conventionally marked by prefixing the field name with X– but this convention was deprecated in 2012 because of the inconveniences it caused when non-standard fields became standard. In detail, the transaction identifier may be transferred as a new extension frame type.

One could define a new frame to carry a transaction identifier between client and server. This could be a stream related frame, for example. This requires that sending and receiving extension frames is supported by the used HTTP/2 library, since it is assumed that the application logic is implemented on top of HTTP/2 library, that is, the logic itself should know the new frame type, not the library underneath.

A transaction identifier could also be communicated over HTTP/2 as an HTTP request parameter. Both GET and POST queries could be used for this purpose, and the decision which one to use could be implementation specific depending on the number of extra bits/bytes needed to carry this information. The HEAD mechanism could also be used, although it has certain technical limitations when compared with GET. Further options for communicating the transaction identifier using HTTP/2 include a HTTP request parameter, and as a header field.

Using HTTP/3 is envisioned to also be possible for the purpose of communicating a transaction identifier. In detail, a SETTINGS frame of HTTP/3 may be applicable for this purpose. SETTINGS parameters are not negotiated, rather they describe characteristics of the sending peer, which can then be used by the receiving peer. The payload of a SETTINGS frame consists of zero or more parameters. Each parameter consists of a setting identifier and a value, both encoded as QUIC variable-length integers.

Alternatively to HTTP/2 or HTTP/3, an out-of-band channel may be employed for communicating the transaction identifiers. For example, a QUIC protocol connection may be used for this purpose. QUIC protocol is on top of UDP and therefore it is a user-space based protocol stack implementation. This means that deploying QUIC modifications is much easier than respective TCP modifications, which would require kernel space changes. QUIC is defined by the Internet Engineering Task Force, IETF.

Using QUIC with HTTP/3, the transaction identifier may be carried inside the same QUIC connection where HTTP/3 based service signalling is carried. Both client and server need, in this example, to support this QUIC data stream carrying the transaction identifier as implemented. If the client uses multiple QUIC connections for the same service transaction, then it is implementation specific whether the identifier is transferred in each connection or only once. If a client node uses the same QUIC connection for multiple service transactions, since HTTP/3 connections are persistent across multiple requests, then it is up to the client to transfer a valid transaction identifier per service transaction.

As one particular embodiment, a same QUIC connection may be used to convey more than one service request, such as service request 210. A group definition may then be signalled implicitly in that first identifier selection information may be provided to a distributed-computing node, which will then apply the first identifier selection information to incoming service requests, causing performance information in reports relating to these service requests to be grouped together, until second identifier selection information is received over the QUIC connection. More generally, any protocol connection which may be kept open may be used in this manner instead of QUIC.

Figure 5:
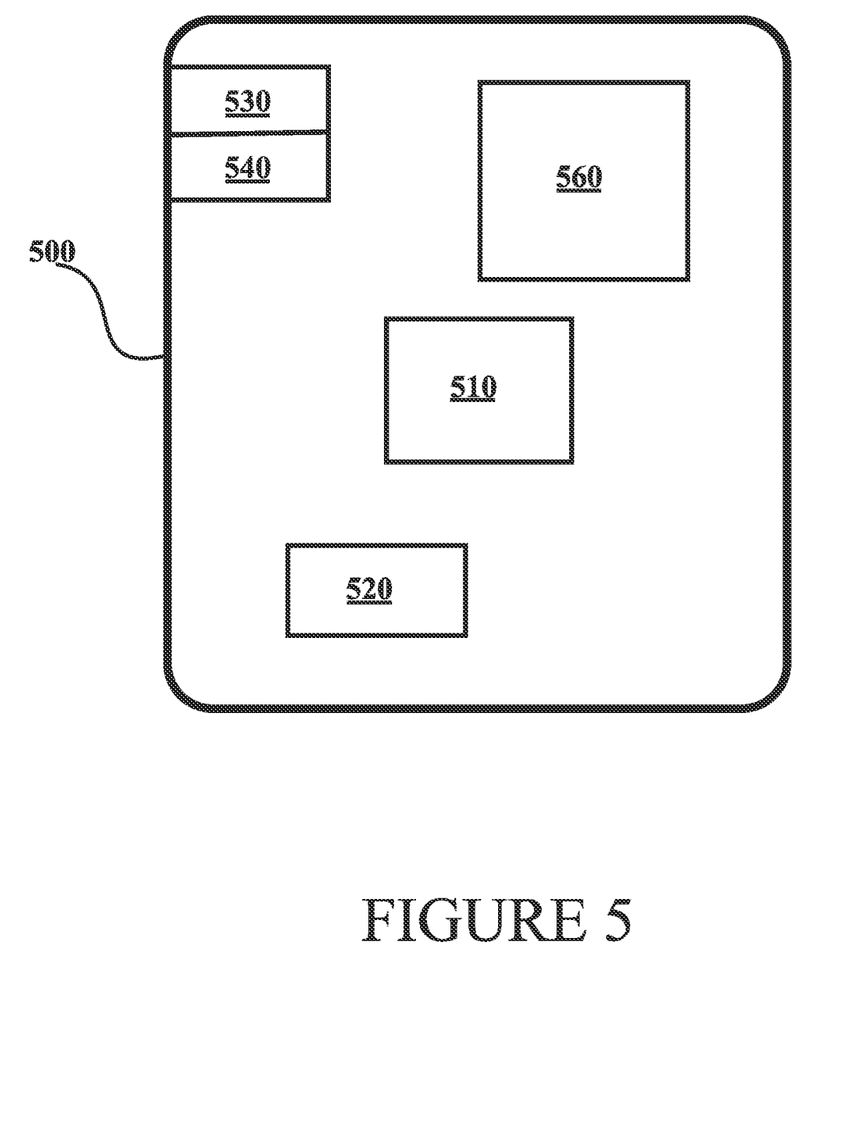
FIG. 5 illustrates an example apparatus capable of supporting at least some embodiments of the present invention.

FIG. 5 illustrates an example apparatus capable of supporting at least some embodiments of the present invention. Illustrated is device 500, which may comprise, for example, a mobile communication device such as performance manager 130 or distributed-computing node 120 of FIG. 1B, for example. Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may comprise more than one processor. Processor 510 may be a control device. A processing core may comprise, for example, a Cortex-A8 processing core manufactured by ARM Holdings or a Zen processing core designed by Advanced Micro Devices Corporation. Processor 510 may comprise at least one Qualcomm Snapdragon and/or Intel Atom processor. Processor 510 may comprise at least one application-specific integrated circuit, ASIC. Processor 510 may comprise at least one field-programmable gate array, FPGA. Processor 510 may be means for performing method steps in device 500, such as storing, receiving, forming, obtaining, performing, transmitting and providing, for example. Processor 510 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a distributed-computing node or performance monitor, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular or non-cellular standard. Transmitter 530 may comprise more than one transmitter. Receiver 540 may comprise more than one receiver. Transmitter 530 and/or receiver 540 may be configured to operate in accordance suitable communication standard(s).

Device 500 may comprise user interface, UI, 560. UI 560 may comprise at least one of a display, a keyboard, a touchscreen, a vibrator arranged to signal to a user by causing device 500 to vibrate, a speaker and a microphone. A user may be able to operate device 500 via UI 560, for example to configure parameters of a distributed computing environment.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively to a serial bus, the transmitter may comprise a parallel bus transmitter. Likewise processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. Alternatively to a serial bus, the receiver may comprise a parallel bus receiver.

Device 500 may comprise further devices not illustrated in FIG. 5. Processor 510, memory 520, transmitter 530, receiver 540 and/or UI 360 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the embodiment various ways of interconnecting at least two of the aforementioned devices may be selected without departing from the scope of the present invention.

Figure 6:
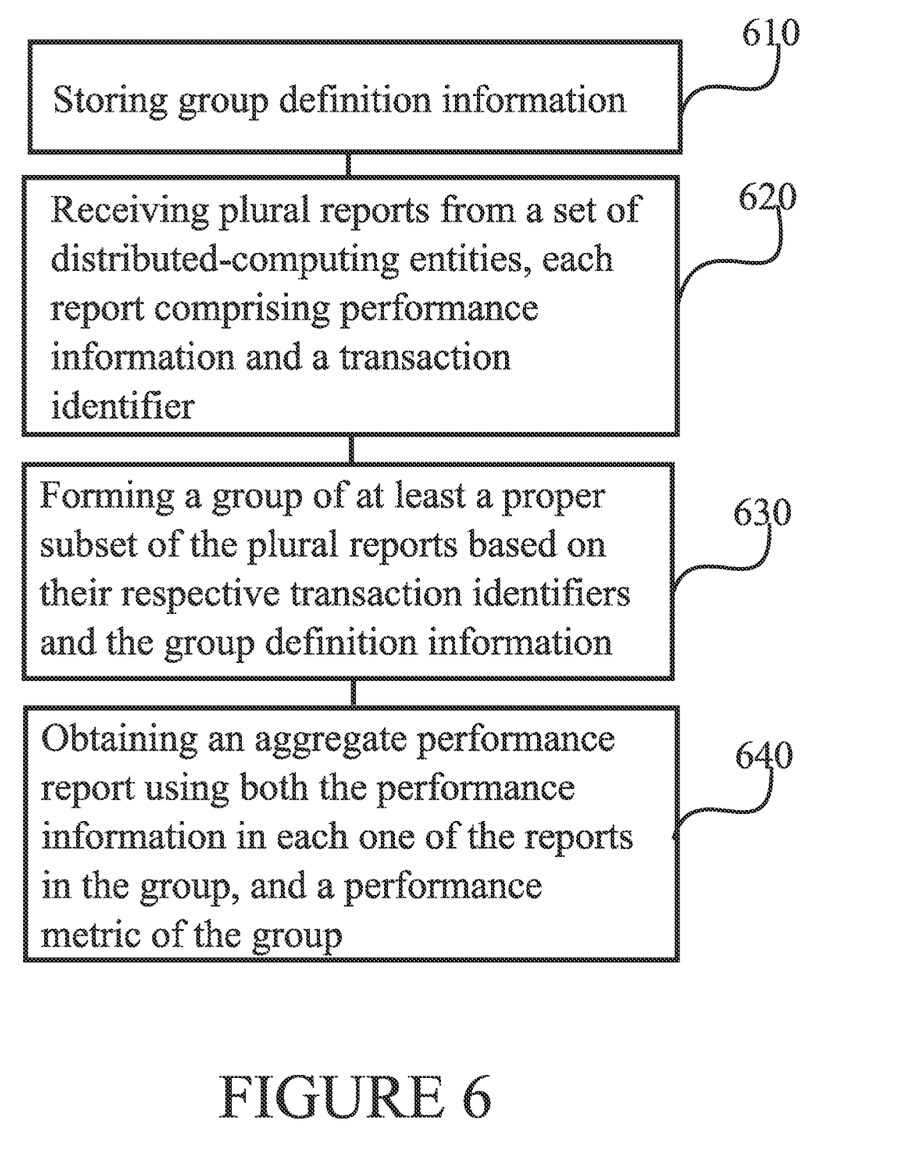
FIG. 6 is a flow graph of a method in accordance with at least some embodiments of the present invention.

FIG. 6 is a flow graph of a method in accordance with at least some embodiments of the present invention. The phases of the illustrated method may be performed in performance manager 130, for example, or in a control device configured to control the functioning thereof, when installed therein. Performance manager 130 may be a logical or a physical node.

Phase 610 comprises storing group definition information. Phase 620 comprises receiving plural reports from a set of distributed-computing entities, each report comprising performance information and a transaction identifier. Phase 630 comprises forming a group of at least a proper subset of the plural reports based on their respective transaction identifiers and the group definition information. Finally, phase 640 comprises obtaining an aggregate performance report using both the performance information in each one of the reports in the group, and a performance metric of the group. Phase 610 may be performed before or after phase 620.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in computing process management.

Acronyms List

3GPP 3$^{rd}$ generation partnership project
E2E end to end
HTTP hypertext transfer protocol

REFERENCE SIGNS LIST

| | |
|---|---|
| 110 | Client node |
| 120, 122, 124 | Distributed-computing nodes |
| 130 | Performance manager |
| 100A, 100B, 100C, 210, 220, 232 | Service requests |
| 100D, 240, 230, 234 | Service request response |
| 218, 228, 250 | Reports |
| 410 | Identifier generator |
| 420 | Bloom filter register |
| 500-560 | Structure of the device of FIG. 5 |
| 610-640 | Phases of the method of FIG. 6 |

The invention claimed is:

1. An apparatus comprising at least one processing core, at least one memory including computer program code, the at least one memory and the computer program code being configured to, with the at least one processing core, cause the apparatus at least to:
store group definition information;
receive plural reports from a set of distributed-computing entities each report comprising performance information and a transaction identifier;
form a group of at least a proper subset of the plural reports based on their respective transaction identifiers and the group definition information, wherein the transaction identifiers in the group are distinct from each other, and
obtain an aggregate performance report using both the performance information in each one of the reports in the group, and a performance metric of the group.

2. The apparatus according to claim 1, wherein the at least one memory and the computer program code are configured to, with the at least one processing core, further cause the apparatus to determine at least one performance report of a specific one of the distributed-computing entities based on a specific report received in the apparatus from the set of distributed-computing entities.

3. The apparatus according to claim 1, wherein the group of reports and the aggregate performance report comprise information on a distributed execution of a single service or function invocation.

4. The apparatus according to claim 1, wherein the reports in the group each comprise the same transaction identifier.

5. The apparatus according to claim 1, wherein the reports in the group each comprise, as the transaction identifier, a pointer to a memory location.

6. The apparatus according to claim 1, wherein the apparatus is configured to form the group by determining the distinct transaction identifiers are comprised in a same identifier group.

7. The apparatus according to claim 6, wherein the apparatus is configured to perform the determining that the distinct transaction identifiers are comprised in a same identifier group by using a filter comprised in the group definition information.

8. The apparatus according to claim 1, wherein the performance information in each report in the group comprises an indication as to at least one of the following: a time delay, at least one timestamp, a processor cycle count, a processor load status of the distributed-computing entity transmitting the respective report, an indication of fault status, a networking resource use, a disk resource use, memory use, and an indication of an absence of a fault status.

9. The apparatus according to claim 1, wherein the performance metric indicates that the performance information in each report in the group are to be joined together in an additive manner to obtain the aggregate performance report.

10. The apparatus according to claim 1, wherein at least one of the reports in the group comprises performance information concerning more than one of the distributed-computing entities.

11. The apparatus according to claim 1, wherein at least one of the reports in the group comprises performance information concerning one and only one of the distributed-computing entities.

12. The apparatus according to claim 1, wherein the distributed-computing entities of the set of distributed-computing entities are physically distinct hardware computation nodes.

13. A method, comprising:
storing group definition information;
receiving plural reports from a set of distributed-computing entities each report comprising performance information and a transaction identifier;
forming a group of at least a proper subset of the plural reports based on their respective transaction identifiers and the group definition information, wherein the transaction identifiers in the group are distinct from each other, and
obtaining an aggregate performance report using both the performance information in each one of the reports in the group, and a performance metric of the group.

14. A non-transitory computer readable medium having stored thereon a set of computer readable instructions that, when executed by at least one processor, cause an apparatus to at least:
store group definition information;
receive plural reports from a set of distributed-computing entities each report comprising performance information and a transaction identifier;
form a group of at least a proper subset of the plural reports based on their respective transaction identifiers and the group definition information, wherein the transaction identifiers in the group are distinct from each other, and
obtain an aggregate performance report using both the performance information in each one of the reports in the group, and a performance metric of the group.

* * * * *